United States Patent
Saxena (10) Patent No.: US 12,006,213 B2
(45) Date of Patent: Jun. 11, 2024

(54) CHEMICALLY MODIFIED STEAM-METHANE REFORMATION PROCESS

(71) Applicant: Surendra Saxena, Miami, FL (US)

(72) Inventor: Surendra Saxena, Miami, FL (US)

( * ) Notice: Subject to any disclaimer, the term of this patent is extended or adjusted under 35 U.S.C. 154(b) by 0 days.

(21) Appl. No.: 18/157,889

(22) Filed: Jan. 23, 2023

(65) Prior Publication Data

US 2023/0382729 A1  Nov. 30, 2023

Related U.S. Application Data (60) Provisional application No. 63/365,369, filed on May 26, 2022.

(51) Int. Cl.
| | | |
|---|---|---|
| *C01B 3/34* | (2006.01) | |
| *C01B 3/10* | (2006.01) | |
| *C01B 32/907* | (2017.01) | |
| *C01B 32/914* | (2017.01) | |

(52) U.S. Cl.
CPC ............... *C01B 3/344* (2013.01); *C01B 3/10* (2013.01); *C01B 32/907* (2017.08); *C01B 32/914* (2017.08); *C01B 2203/02* (2013.01); *C01B 2203/1241* (2013.01)

(58) Field of Classification Search
CPC ..... C01B 3/344; C01B 32/914; C01B 32/907; C01B 3/10; C01B 2203/02; C01B 2203/1241
USPC ...................................................... 423/415.1
See application file for complete search history.

(56) References Cited

U.S. PATENT DOCUMENTS

| | | |
|---|---|---|
| 2013/0248768 A1 | 9/2013 | Zachar |
| 2021/0229996 A1* | 7/2021 | Fadhel ................. B01J 37/0209 |
| 2022/0119251 A1* | 4/2022 | Verykios ................ B01J 23/755 |
| 2022/0259043 A1 | 8/2022 | Jin et al. |

FOREIGN PATENT DOCUMENTS

CA    2550639 C    8/2010

OTHER PUBLICATIONS

Methane pyrolysis for zero-emission hydrogen production: A potential Bridge technology from fossil fuels to a renewable and sustainable hydrogen economy Nuria Sanchez-Bastardo et al. I&EC research, v 60, pp. 11855-11881 (Year: 2021).*

(Continued)

*Primary Examiner* — Douglas B Call
(74) *Attorney, Agent, or Firm* — Nolan IP Law; Jason Nolan (57) ABSTRACT

A method of producing hydrogen gas is provided. The method can include the steps of providing a reaction vessel containing aluminum, delivering a stream of natural gas to the reaction vessel, in which the natural gas includes methane, and heating the reaction vessel at a temperature in a range of 300 to 800° C., in which the heating causes a chemical reaction between the methane and the aluminum to provide hydrogen gas and aluminum carbide. The method can include delivering steam to the reaction vessel and heating the reaction vessel at a temperature in a range of 300 to 800° C., in which the heating causes a chemical reaction between the methane, steam, and the aluminum to provide hydrogen gas, aluminum carbide, and aluminum oxycarbide.

20 Claims, 4 Drawing Sheets

(56) References Cited

OTHER PUBLICATIONS

Ni/CaO—Al2O3 bifunctional catalysts for sorption-enhanced steam methane reforming Pan Xu et al AlChE Journal, v 60, No. 10, pp. 3547-3556 (Year: 2014).*

Interface and interfacial reactions in multi-walled carbon nanotube-reinforced aluminum matrix composites Weiwei Zhou et al Carbon, v 96, pp. 919-928 (Year: 2016).*

A review on methane transformation to hydrogen and nanocarbon: Relevance of catalyst characteristics and experimental parameters on yield U.P.M. Ashik et al. Renewable and Sustainable Energy Reviews, v76, pp. 743-767 (Year: 2017).*

Thermodynamics of Tower-Block Infernos: Effects of Water on Aluminum Fires John F. Maguire Entropy 22, 14, pp. 1-14 (Year: 2020).*

Noppakun, Nichamon et al., Hydrogen production from sorption-enhanced steam methane reforming chemical-looping, IOP Conf. Series: Materials Science and Engineering (2020), 736, Apr. 2009, pp. 1-7.

\* cited by examiner

CHEMICALLY MODIFIED STEAM-METHANE REFORMATION PROCESS

CROSS-REFERENCE TO RELATED APPLICATIONS

This application claims the benefit of priority under 35 U.S.C. § 119(e) of U.S. Provisional Application Ser. No. 63/365,369 filed on May 26, 2022, the content of which is relied upon and incorporated herein by reference in its entirety.

FIELD

The disclosure relates generally to a process of producing hydrogen gas, and more particularly to process of producing hydrogen gas without concurrently producing undesirable carbon emissions.

BACKGROUND

The steam-methane reformation (SMR) process is used to produce about 95% of the hydrogen produced in the United States. Hydrogen obtained by the SMR process is substantially pure and can be used, for example, as an energy carrier in fuel cells. In the SMR process, methane ($CH_4$) provided from a natural gas feedstock is reacted with steam (water, $H_2O$) under 3-25 bar pressure at temperatures in the range of 700-1000° C. in the presence of a catalyst to produce hydrogen ($H_2$), carbon monoxide (CO), and relatively small amounts of carbon dioxide ($CO_2$). The SMR reaction is represented below by equation (1). Additional hydrogen is produced along with carbon dioxide ($CO_2$) by the reaction of water and carbon monoxide, as shown in equation (2) (known as the water-gas shift reaction), and by the reaction of methane and water, as shown in equation (3).

$$CH_4 + H_2O + \text{heat} \rightarrow H_2 + CO \quad (1)$$

$$CO + H_2O \rightarrow H_2 + CO_2 \quad (2)$$

$$CH_4 + 2H_2O \rightarrow 4 \rightarrow H_2 + CO_2 \quad (3)$$

The existing SMR process of producing hydrogen is endothermic. Therefore, the existing SMR process has the drawback of requiring significant energy to heat the reaction mixture to temperatures in the range of about 700-1000° C. Another drawback to the SMR method is for each kilogram of hydrogen ($H_2$) produced, about 8 to 9 kilograms of carbon monoxide (CO) and carbon dioxide ($CO_2$) is also produced, as demonstrated in industrial manufacturing.

SUMMARY

In various embodiments, a method of producing hydrogen gas is provided. The method can include the steps of providing a reaction vessel containing aluminum, delivering a stream of natural gas to the reaction vessel, in which the natural gas contains about 95% methane, and heating the reaction vessel at a temperature in a range of 300 to 800° C., whereby the heating causes a chemical reaction between the methane and the aluminum to provide hydrogen gas and aluminum carbide.

In some embodiments, the temperature is in a range of 500 to 700° C. In some embodiments, the temperature is at least 600° C.

In some embodiments, the aluminum and the methane are provided in a molar ratio ranging from 1:1 to 20:1. In some embodiments, the aluminum and the methane are provided in a molar ratio ranging from 1:1 to 10:1. In some embodiments, the aluminum and the methane are provided in a molar ratio of 4:3.

In some embodiments, a change in enthalpy for the chemical reaction is in a range of −10 kilojoules to 0 kilojoules. In some embodiments, a change in enthalpy for the chemical reaction is in a range of −7 kilojoules to −3 kilojoules.

In some embodiments, water or steam are not present in the reaction vessel during the chemical reaction.

In various embodiments, the method of producing hydrogen gas can include the steps of providing a reaction vessel containing aluminum; delivering a stream of natural gas to the reaction vessel, wherein the natural gas comprises methane; delivering steam to the reaction vessel; and heating the reaction vessel at a temperature in a range of 300 to 800° C.; wherein the heating causes a chemical reaction between the methane, steam, and the aluminum to provide hydrogen gas and aluminum carbonate.

In some embodiments, the temperature is in a range of 400 to 600° C.

In some embodiments, the aluminum and the methane are provided in a molar ratio ranging from 1:1 to 20:1. In some embodiments, the aluminum and the methane are provided in a molar ratio ranging from 1:1 to 10:1. In some embodiments, the aluminum and the methane are provided in a molar ratio of 4:3.

In some embodiments, a change in enthalpy for the chemical reaction is in a range of −10 kilojoules to 0 kilojoules. In some embodiments, the change in enthalpy for the chemical reaction is in a range of −7 kilojoules to −3 kilojoules.

It is to be understood that both the foregoing general description and the following detailed description describe various embodiments and are intended to provide an overview or framework for understanding the nature and character of the claimed subject matter.

The accompanying drawings are included to provide a further understanding of the various embodiments and are incorporated into and constitute a part of this specification. The drawings illustrate the various embodiments described herein and, together with the description, explain the principles and operations of the claimed subject matter.

BRIEF DESCRIPTION OF THE DRAWINGS

A complete understanding of the present embodiments and the advantages and features thereof will be more readily understood by reference to the following detailed description, appended claims, and accompanying drawings, wherein:

The drawings are not necessarily to scale, and certain features and certain views of the drawings may be shown exaggerated in scale or in schematic in the interest of clarity and conciseness.

DETAILED DESCRIPTION

Reference will now be made in detail to the exemplary embodiment(s), which is/are illustrated in the examples. Before describing the exemplary embodiments, it is noted the embodiments reside primarily in combinations of components and procedures related to the disclosed process. Accordingly, the method components have been represented where appropriate, showing only those specific details that are pertinent to understanding the embodiments of the present disclosure so as not to obscure the disclosure with details that will be readily apparent to those of ordinary skill in the art having the benefit of the description herein. The specific details of the various embodiments described herein are used for demonstration purposes only, and no unnecessary limitation or inferences are to be understood therefrom.

In various embodiments, as can be understood in the context of FIGS. 1-4, a chemically modified SMR process of producing hydrogen is provided. Consistent with the existing SMR process in equation (1), the chemically modified SMR process involves the reaction of methane ($CH_4$) and steam (water, $H_2O$). But unlike the existing SMR process in equation (1), the chemically modified SMR process of producing hydrogen disclosed herein does not produce carbon monoxide (CO) and/or carbon dioxide ($CO_2$). In some embodiments, the chemically modified SMR process of producing hydrogen disclosed herein does not produce any carbon emissions.

In various embodiments, the chemically modified SMR process disclosed herein comprises the reaction of methane ($CH_4$), steam (water, $H_2O$), and a metal (M) to produce hydrogen ($H_2$), a metal carbide ($M_xC_y$, wherein x and y represent the number of respective atoms in the compound) and/or a metal oxycarbide ($M_{x'}O_zC_{y'}$, wherein x', y', and z represent the number of respective atoms in the compound), and a metal oxide ($M_xO_{z'}$, wherein x and z' represent the number of respective atoms in the compound), as shown below in equation (4).

$$CH_4 + H_2O + M \rightarrow H_2 + M_xC_y M_{x'}O_zC_{y'} M_xO_{z'} \qquad (4)$$

In some embodiments according to equation (4), the metal (M) is converted into the metal carbide ($M_xC_y$) and/or the metal oxycarbide ($M_{x'}O_zC_{y'}$). The metal carbide and/or metal oxycarbide are solid compounds that can be removed from the mixture in the reaction vessel and isolated. In some embodiments, the metal carbide and/or metal oxycarbide are valuable compounds for one or more industrial applications. In such embodiments, the chemically modified SMR process efficiently and effectively produces hydrogen gas, industrially useful by-products, and no carbon emissions. In some embodiments, the chemically modified SMR process of producing hydrogen according to equation (4) is an exothermic process.

In some embodiments, the metal (M) in equation (4) is aluminum (Al). The aluminum can be in any suitable form. In some embodiments, for example, the aluminum is powdered aluminum prepared using a planetary mill under inert atmospheric conditions. In some embodiments, the aluminum in scrap aluminum, or a combination of scrap aluminum and powdered aluminum. In some embodiments, the chemically modified SMR process comprises the reaction of methane ($CH_4$), steam (water, $H_2O$), and aluminum (Al) to produce hydrogen ($H_2$), aluminum carbide ($Al_4C_3$), and aluminum oxycarbide ($Al_4O_4C$), as shown below in the balanced equation (5). This process, which includes water, is referred to herein as the hydrous process.

$$2CH_4 + 1H_2O + 3.3Al \rightarrow 4.95H_2 + 0.575Al_4C_3 + 0.25Al_4O_4C \qquad (5)$$

In some embodiments according to the equation (5), the aluminum (Al) is converted into aluminum carbide ($Al_4C_3$) and/or aluminum oxycarbide ($Al_4O_4C$). In such embodiments, the aluminum carbide and/or aluminum oxycarbide can be removed from the reaction mixture and isolated. A person of ordinary skill in the art would appreciate that aluminum carbide can be a useful component in various industrial applications, including, for example, the production of cutting tools. A person of ordinary skill in the art would appreciate that aluminum oxycarbide can be a useful component in various industrial applications, including, for example, as a refractory material, as a filler in the production of plastics, as a component in the production of glass, and as a component in various chemical processes.

In some embodiments, the chemically modified hydrous process according to equation (5) efficiently and effectively produces hydrogen gas, industrially useful by-products, and no carbon emissions. In some embodiments, the reaction is carried out in an inert gas reactor and/or in the presence of a continuously flowing excess of natural gas. In some embodiments, the presence of any oxygen contaminants in the reaction vessel will increase the amount of oxycarbide components produced.

In some embodiments according to the equation (5), 3.3 moles of aluminum (Al) are used for 1.0 mole of steam and 2.0 moles of methane to provide 4.95 moles of hydrogen gas, moles of aluminum carbide ($Al_4C_3$), and 0.25 moles of aluminum oxycarbide ($Al_4O_4C$). In some embodiments, the change in enthalpy ($\Delta H$) for the reaction in equation (5) is in the range of about 0 kilojoules (kj) to about −4 kj, including about −1.52 kj, whereby $\Delta H$ represents the heat evolved in the exothermic reaction. In some embodiments according to equation (5), for every 32 kilograms (kg) of methane, 18 kg of water, and 89 kg of aluminum, the process will provide almost 10 kg of hydrogen, about 83 kg of aluminum carbide, and some aluminum oxycarbide.

In some embodiments, the hydrous process according to equation (5) can be carried out at a temperature in the range of about 200° C. to about 700° C.; about 300° C. to about 600° C.; about 300° C. to about 500° C.; about 350° C. to about 450° C.; about 375° C. to about 425° C.; or about 400° C. to about 500° C. In some embodiments, the hydrous process is carried out at a pressure in the range of about 1 bar to about 10 bars. In some embodiments, the hydrous process utilizes a catalyst. In some embodiments, the catalyst is nickel or a nickel-based catalyst.

In various embodiments, an anhydrous process of producing hydrogen gas is disclosed. In some embodiments, the anhydrous process comprises the reaction of methane ($CH_4$) and a metal (M) to produce hydrogen ($H_2$) and a metal carbide ($M_xC_y$, wherein x and y represent the number of respective atoms in the compound), as shown below in equation (6). In such embodiments, the anhydrous process does not include steam (water, $H_2O$) and therefore does not produce a metal oxide ($M_wO_z$, wherein w and z represent the number of respective atoms in the compound), as shown below in equation (6).

$$CH_4 + M \rightarrow H_2 + M_xC_y \qquad (6)$$

In some embodiments according to equation (6), the metal (M) is converted into a metal carbide ($M_xC_y$), and the metal carbide is a solid compound that can be removed from the reaction mixture and isolated. In some embodiments, the metal carbide is a valuable compound for one or more industrial applications. In such embodiments, the anhydrous process efficiently and effectively produces hydrogen gas and an industrially useful by-product without producing any carbon emissions, such as carbon monoxide (CO) and/or carbon dioxide (CO 2).

In some embodiments, the metal (M) in equation (6) is aluminum (Al). The aluminum can be in any suitable form. In some embodiments, for example, the aluminum is powdered aluminum prepared using a planetary mill under inert atmospheric conditions. In some embodiments, the anhydrous process comprises the reaction of methane ($CH_4$) and aluminum (Al) to produce hydrogen ($H_2$) and aluminum carbide ($Al_4C_3$), as shown below in the balanced equation (7).

$$3CH_4 + 4Al \rightarrow 6H_2 + 0.99Al_4C_3 \qquad (7)$$

Under these conditions, the reaction is anhydrous, which means steam (water, $H_2O$) is not used as a reactant in the reaction. In some embodiments, moisture in the form of water or steam is not present in the reaction vessel during the chemical reaction.

In some embodiments according to equation (7), the aluminum (Al) is converted into aluminum carbide ($Al_4C_3$), which can be removed from the reaction mixture and isolated. As previously noted, aluminum carbide can be used in various industrial applications. In some embodiments, the anhydrous process efficiently and effectively produces hydrogen gas and the industrially useful aluminum carbide by-product without producing any carbon emissions. In some embodiments, no carbon monoxide (CO) and/or carbon dioxide ($CO_2$) is produced.

In some embodiments according to balanced equation (7), 4.0 moles of aluminum (Al) is used for 3.0 moles of methane to provide 6.0 moles of hydrogen gas ($H_2$) and 0.99 moles of aluminum carbide ($Al_4C_3$). In some embodiments, the aluminum and methane are provided in a molar ratio ranging from 1:1 to 20:1 (aluminum:methane), including, for example, a ratio of 2:1, 3:1, 3:2, 4:1, 4:3, 5:1, 5:2, 5:3, 5:4, 6:1, 6:5, 7:1, 7:2, 7:3, 7:4, 7:5, 7:6, 8:1, 8:3, 8:5, 8:7, etc. In some embodiments, the aluminum and the methane are provided in a molar ratio of 4:3. In some embodiments according to equation (7), for every 48 kg of methane and 108 kg of aluminum used in the chemical reaction, the process will provide almost 12 kg of hydrogen and about 144 kg of aluminum carbide.

In some embodiments, the anhydrous process according to balanced equation (7) is endothermic. In some embodiments, the change in enthalpy ($\Delta H$) is in the range of 0 kilojoules to 4 kilojoules. The range includes all subranges and endpoints, including 1 kJ, 2 kJ, 3 kJ, 4 kJ. The $\Delta H$ indicates that heat is required for the endothermic reaction.

In some embodiments, the process according to equation (7) can be carried out at around the melt temperature of aluminum, which is 661° C. In some embodiments, the temperature of the anhydrous process is in the range of about 550° C. to about 900° C.; about 600° C. to about 800° C.; about 600° C. to about 700° C.; about 625° C. to about 700° C.; about 650° C. to about 675° C.; about 660° C. to about 670° C.; about 590° C. to about 680° C., etc. In some embodiments, the temperature of the process is at least 600° C., at least 650° C., at least 660° C., at least 661° C., at least 670° C., etc. In some embodiments, the anhydrous process is carried out at a pressure in the range of about 1 bar to about 10 bars. In some embodiments, the anhydrous process utilizes a catalyst. In some embodiments, the catalyst is nickel or a nickel-based catalyst.

The reaction vessel for carrying out the processes according to equations (4)-(7) can be any suitable equipment configured for multiphase (liquid, solid, gas) chemical reactions. In some embodiments, for example, the reaction vessel is a fluidized bed reactor, consistent with the reaction vessel 100 shown in FIG. 1. In some embodiments, the reaction vessel 100 comprises the inlet 110, the inlet 130, the outlet 140, and the outlet 150. In such embodiments, the reactants 200 and 210 are added to the reaction vessel 100 through the inlets 110 and 130, respectively. In some embodiments, the product 240 is released through the outlet 140, whereas the by-products 230 of the reaction are removed through the outlet 150.

Figure 1:
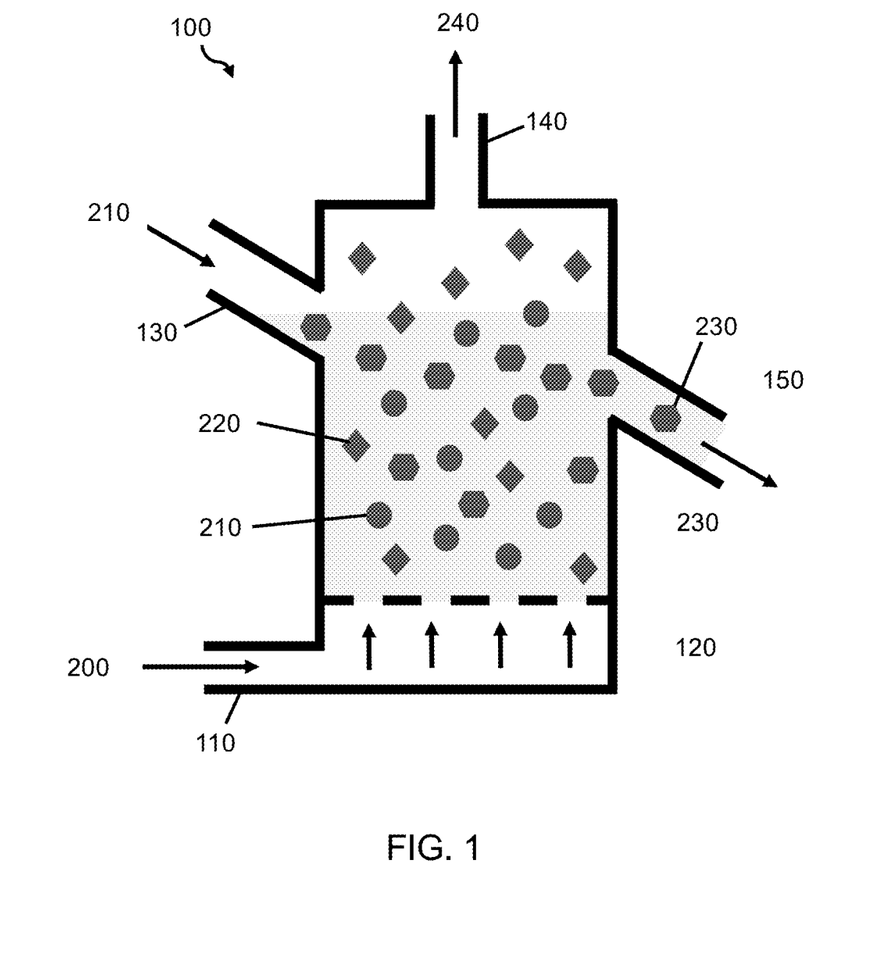
FIG. 1 is a schematic view of a fluidized bed reactor that can be used to carry out the chemically modified SMR process, in accordance with embodiments disclosed herein.

The reaction vessel 100 can be comprised of any suitable material. In this context, a suitable material is a hydrogen-impermeable metal. In this context, the suitability of the reaction vessel is also based on its corrosion resistance and resistance to strong oxidizing solutions, strong durability in reducing environments, and tolerance to chemicals under high temperature conditions. In some embodiments, the reaction vessel 100 comprises a Hastelloy, which is the commercial name for nickel-based corrosion-resistant alloys comprising molybdenum, chromium, and/or iron.

In some embodiments, the reactant 200 is a natural gas composition, which is mainly methane gas ($CH_4$) 220 and other hydrocarbon compounds. Methane is the predominant component in natural gas and accounts for about 95% of the composition. The other hydrocarbon components include ethane (~4%), propane (~0.2%), and butane (~0.02%). In various embodiments, the hydrocarbon gases other than methane break down at the temperatures utilized during the reaction.

In some embodiments, the reactant 200 is natural gas and the co-reactant 210 is a metal selected for its reaction chemistry with methane 220, the predominant component of the natural gas. In some embodiments, the product 240 is released through the outlet 140, and the by-products 230 of the reaction are removed through the outlet 150.

In some embodiments, the reactant 200 is natural gas and the co-reactant 210 is aluminum metal. In such embodiments, the product 240 is hydrogen gas ($H_2$) and the by-products 230 are aluminum carbide ($Al_4C_3$) and aluminum oxide ($Al_2O_3$), the former depending on the amount of oxygen contamination in the natural gas.

In some embodiments, the chemically modified SMR process is an exothermic reaction. In some embodiments, the chemically modified SMR process is an endothermic reaction. The exothermic or endothermic nature of the chemically modified SMR process has been confirmed, for example, using thermodynamic calculations, established thermodynamic data, and information associated with industrial production of hydrogen.

The following examples are provided to aid in the understanding of the present disclosure, the true scope of which is set forth in the appended claims. One of skill in the art would appreciate that modifications can be made in the procedures set forth without departing from the spirit of the disclosure.

EXAMPLE(S)

Calculations were used to evaluate the chemically modified SMR processes described in the examples below. The calculations were obtained using the FactSage software platform, which contains databases of thermodynamic data for thousands of compounds, and which allows users to calculate the conditions for multiphase, multicomponent equilibria, with a wide variety of tabular and graphical output modes, under a large range of constraints. The thermochemical databases contain parameters that provide the Gibbs (G) energy of compounds as a function of temperature, pressure, and of all solutions as a function of temperature, pressure, and composition. Thermodynamic properties can be calculated by taking the appropriate derivatives of the G functions. For a set of constraints (e.g., temperature, total pressure, total mass of each element) the FactSage software can calculate the equilibrium conditions by minimizing the total Gibbs energy of the system, which is mathematically equivalent to solving all the equilibrium constant equations simultaneously.

Figure 2:
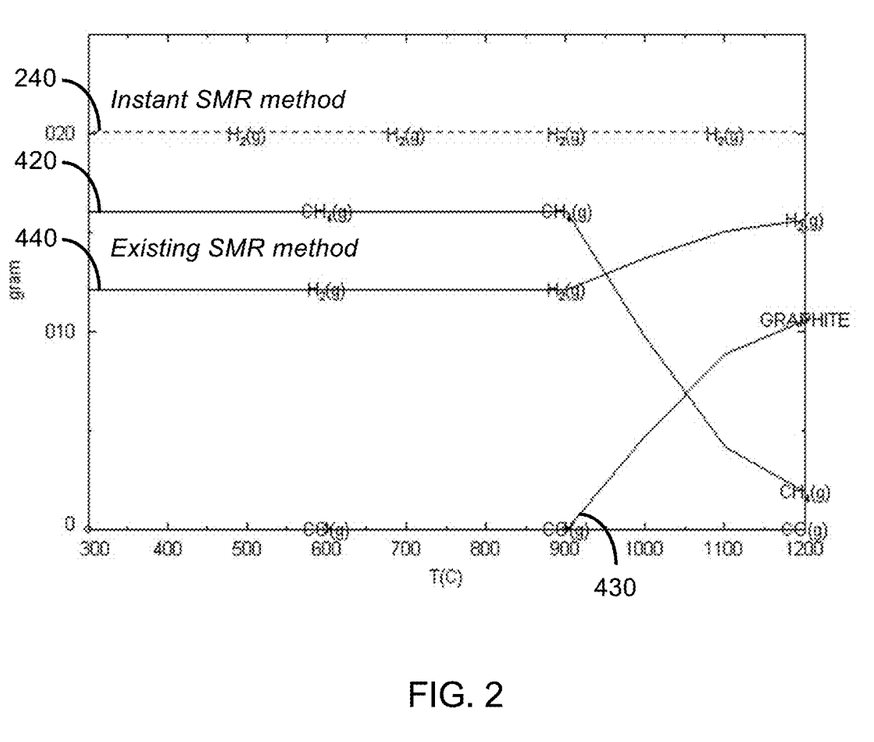
FIG. 2 is a graph showing the amount of hydrogen produced by a chemically modified SMR method disclosed herein compared to an existing SMR method.

FIG. 2 is a graph showing comparative data obtained from a series of calculations. A temperature ranging from 300 to 1200 degrees Celsius (° C.) is shown on the x-axis, and a concentration ranging from 0 to about 25 grams is displayed on the y-axis. The graph shows the concentration per temperature for the gas components involved in the existing SMR process and for the chemically modified SMR hydrous process of the present disclosure.

The series of calculations in FIG. 2 involved an input of 64 grams (g) of methane ($CH_4$), 36 grams of aluminum (Al) powder, and steam. The calculations were determined for a temperature of 600° C. The output of the reaction included the conversion of methane to hydrogen gas ($H_2$) and the conversion of aluminum powder into various forms of aluminum carbide and aluminum oxide.

As shown in FIG. 2, the data from the calculations show that hydrogen produced by the existing SMR process (solid lines 420 and 440) starts to convert methane into hydrogen and carbon monoxide at around 900° C., whereas the chemically modified SMR process disclosed herein (broken line 240) converts methane into hydrogen over a broad range of temperatures (300-1200° C.). The data provided in FIG. 2 shows the existing SMR process produces about 16 grams of hydrogen, whereas the chemically modified SMR hydrous process produces about 20 grams of hydrogen. Accordingly, in view of the data from the calculations summarized in FIG. 2, the chemically modified SMR hydrous process disclosed herein provides an unexpected increase of 25% more hydrogen compared to the existing SMR method. The improved production of hydrogen in the chemically modified SMR hydrous process is complemented by the absence of any carbon emissions, such as carbon monoxide (CO) and/or carbon dioxide ($CO_2$).

Figure 3:
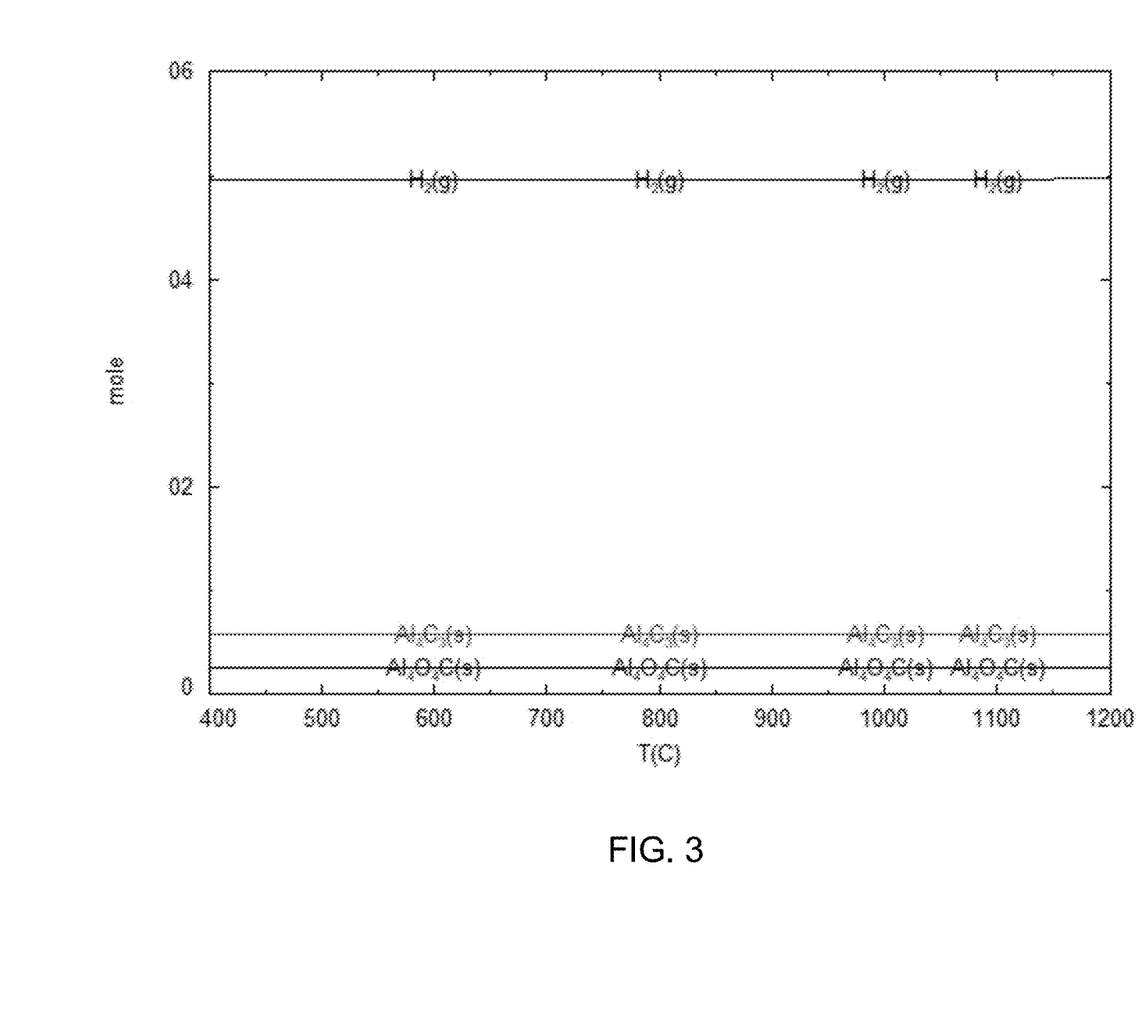
FIG. 3 is a graph showing the moles of hydrogen, aluminum oxycarbide, and aluminum carbide produced by the chemically modified SMR method comprising methane ($CH_4$), aluminum (Al), and steam (water, $H_2O$), in accordance with embodiments disclosed herein.

FIG. 3 is a graph showing the data from the calculations according to balanced equation (5). In the graph, a temperature ranging from 400 to 1200 degrees Celsius (° C.) is shown on the x-axis, and a concentration ranging from 0 to 6 moles is displayed about the y-axis. The graph shows the concentration per temperature for the components involved in the chemically modified hydrous process of the present disclosure. In the graph, the hydrous reaction according to balanced equation (5) produces about 5 moles of hydrogen, about 0.5 moles of aluminum carbide ($Al_4C_3$) and about 0.025 moles of aluminum oxycarbide ($Al_4O_4C$).

Figure 4:
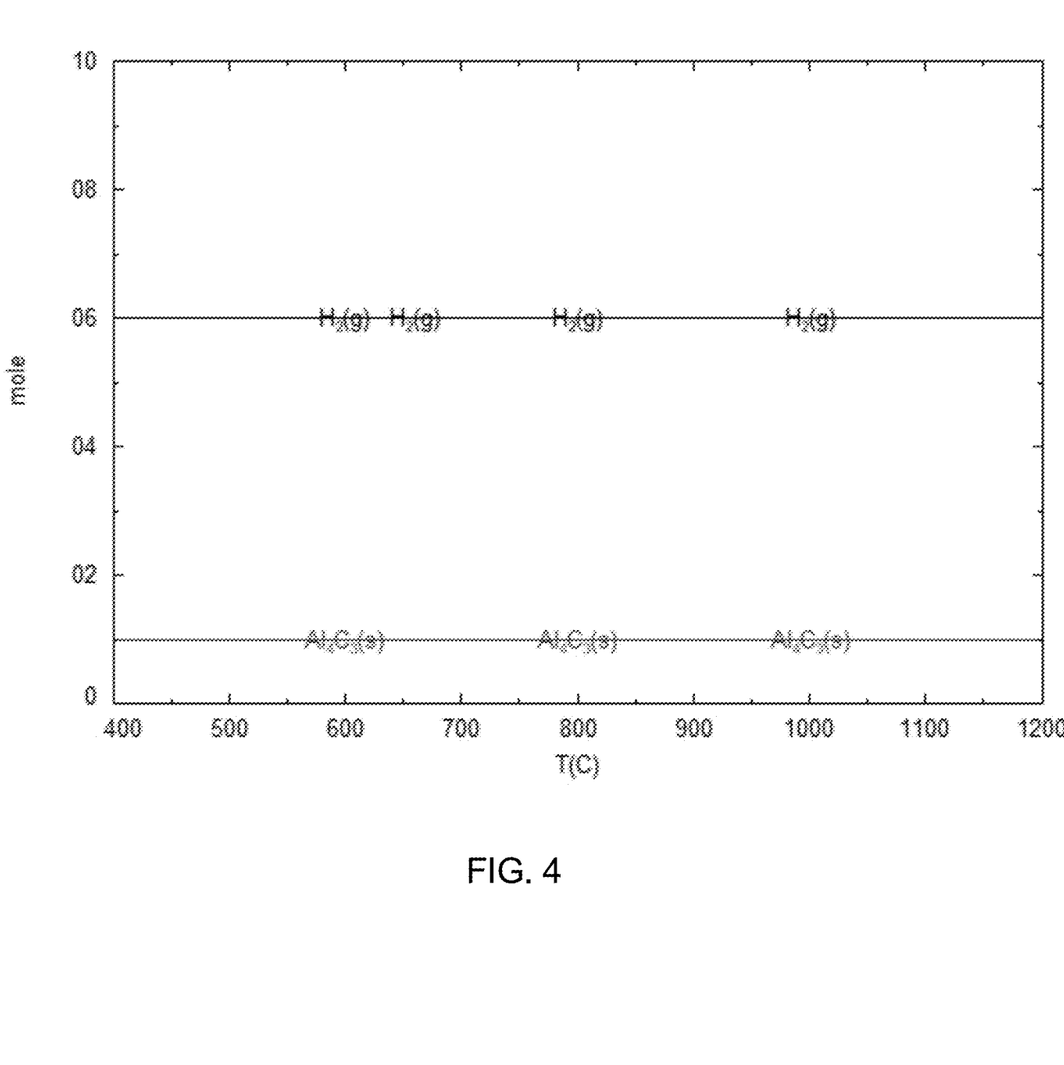
FIG. 4 is a graph showing the hydrogen and aluminum carbide produced by a chemically modified SMR method comprising methane ($CH_4$), aluminum (Al), in accordance with embodiments disclosed herein.

FIG. 4 is a graph showing the data from the calculations according to balanced equation (7). In the graph, a temperature ranging from 400 to 1200 degrees Celsius (° C.) is shown on the x-axis, and a concentration ranging from 0 to 10 moles is displayed on the y-axis. The graph shows the concentration per temperature for the components involved in the chemically modified anhydrous process of the present disclosure. In the graph, the anhydrous reaction according to balanced equation (7) produces about 6 moles of hydrogen and about 1 mole of aluminum carbide ($Al_4C_3$).

In various embodiments, a chemically modified SMR method of producing hydrogen is provided. In some embodiments, the method includes a reaction between methane from natural gas and a metal. In some embodiments, the method includes a reaction between methane from natural gas and aluminum. The reaction between the methane contained in the natural gas and the metal co-reactant results in the production of hydrogen gas, metal carbides, metal oxycarbides, and, in some embodiments, metal oxides. The chemically modified SMR methods of producing hydrogen disclosed herein are advantageous because the hydrogen gas is produced in greater amounts compared to the amount of hydrogen produced by existing SMR methods. The chemically modified SMR methods of producing hydrogen disclosed herein are further advantageous because the metal carbide and/or metal oxycarbide byproducts produced in the processes can be isolated and repurposed for various industrial applications. The chemically modified SMR methods of producing hydrogen in the instant disclosure result in no carbon emissions, such as carbon monoxide (CO) and/or carbon dioxide (CO 2). The chemically modified SMR methods of producing hydrogen in the instant disclosure do not require the extremely high temperatures required for the existing SMR method; thus reducing the energy requirements to produce the hydrogen gas.

A recitation of ranges of values herein are merely intended to serve as a shorthand method of referring individually to each separate value falling within the range, unless otherwise indicated herein, and each separate value is incorporated into the specification as if it were individually recited herein. As will be understood by one skilled in the art, ranges disclosed herein encompass any and all possible subranges and combinations of subranges thereof. Any listed range can be easily recognized as sufficiently describing the same range being broken down into at least equal halves, thirds, quarters, fifths, tenths, etc. As a non-limiting example, each range discussed herein can be readily broken down into a lower third, middle third and upper third, etc. As will also be understood by one skilled in the art, language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a component provided in 1-3 grams refers to the component being provided in 1, 2, or 3 grams.

As used herein, the use of examples, or exemplary language (e.g., "such as"), is intended to illuminate the embodiments and does not pose a limitation on the scope of the claims unless otherwise stated. No language in the specification should be construed as indicating any non-claimed element as essential.

As used herein, the terms "about" and "substantially" will be understood by persons of ordinary skill in the art and will vary to some extent depending upon the context in which it is used. If there are uses of the term which are not clear to persons of ordinary skill in the art, given the context in which it is used, "about" and "substantially" will mean up to plus or minus 10% of the particular term.

Exemplary embodiments of the methods are described above in detail. The methods are not limited to the specific embodiments described herein, but rather, steps of the method may be utilized independently and separately from other steps described herein. All methods described herein can be performed in any suitable order unless otherwise indicated herein or otherwise clearly contradicted by context.

The foregoing embodiments are provided to aid in the understanding of the present disclosure, the true scope of which is set forth in the appended claims. This written description uses examples to disclose the present embodiments, including the best mode, and also to enable any person skilled in the art to practice the present embodiments, including performing any methods. The patentable scope of the present embodiments is defined by the claims, and may include other examples that occur to those skilled in the art. Such other examples are intended to be within the scope of the claims if they have elements that do not differ from the literal language of the claims, or if they include equivalent elements with insubstantial differences from the literal language of the claims.

I claim:

1. A method of producing hydrogen gas, comprising:
   providing a reaction vessel containing elemental aluminum (Al);
   delivering a stream of natural gas to the reaction vessel, wherein the natural gas comprises methane; and
   heating the reaction vessel at a temperature in a range of 300 to 800° C.;
   wherein the heating causes a chemical reaction between the methane and the aluminum to provide hydrogen gas.

2. The method of claim 1, wherein the chemical reaction further provides aluminum carbide.

3. The method of claim 2, wherein the temperature is in a range of 500 to 700° C.

4. The method of claim 1, wherein the temperature is in a range of 590 to 675° C.

5. The method of claim 1, wherein the temperature is in the range of 600° C. to 800° C.

6. The method of claim 1, wherein the aluminum and methane are provided in a molar ratio ranging from 1:1 to 20:1.

7. The method of claim 1, wherein the aluminum and methane are provided in a molar ratio ranging from 1:1 to 10:1.

8. The method of claim 1, wherein the aluminum and the methane are provided in a molar ratio of 4:3.

9. The method of claim 1, wherein a change in enthalpy for the chemical reaction is in a range of 0 kilojoules/mol to 4 kilojoules/mol.

10. The method of claim 1, wherein no carbon monoxide (CO) or carbon dioxide ($CO_2$) is produced by the chemical reaction.

11. The method of claim 1, wherein water or steam are not present in the reaction vessel during the chemical reaction.

12. A method of producing hydrogen gas, comprising:
    providing a reaction vessel containing elemental aluminum (Al);
    delivering a stream of natural gas to the reaction vessel, wherein the natural gas comprises methane;
    delivering steam to the reaction vessel; and
    heating the reaction vessel at a temperature in a range of 300 to 800° C.;
    wherein the heating causes a chemical reaction between the methane, steam, and the aluminum to provide hydrogen gas.

13. The method of claim 12, wherein the chemical reaction further provides aluminum carbide.

14. The method of claim 12, wherein the chemical reaction further provides aluminum oxycarbide.

15. The method of claim 12, wherein the temperature is in a range of 400 to 600° C.

16. The method of claim 12, wherein the aluminum and the methane are provided in a molar ratio ranging from 1:1 to 20:1.

17. The method of claim 12, wherein the aluminum and the methane are provided in a molar ratio ranging from 1:1 to 10:1.

18. The method of claim 12, wherein the aluminum and the methane are provided in a molar ratio of 4:3.

19. The method of claim 12, wherein a change in enthalpy for the chemical reaction is in a range of 0 kilojoules/mol to −4 kilojoules/mol.

20. The method of claim 12, wherein no carbon monoxide (CO) or carbon dioxide ($CO_2$) is produced by the chemical reaction.

* * * * *